United States Patent Office 3,509,092
Patented Apr. 28, 1970

3,509,092
STABILIZATION OF RIGID
POLY(VINYL CHLORIDE)
Matthew Peter Di Giaimo, Old Bridge, N.J., assignor to American Cyanamid Company, Stamford, Conn., a corporation of Maine
No Drawing. Continuation-in-part of application Ser. No. 728,076, May 9, 1968. This application Dec. 18, 1968, Ser. No. 784,894
Int. Cl. C08f 45/60
U.S. Cl. 260—45.8                              9 Claims

ABSTRACT OF THE DISCLOSURE

Stabilized, rigid poly(vinyl chloride) compositions wherein the stabilizer is a combination of an amide of an aliphatic carboxylic acid and an ultraviolet absorber which is per se capable of imparting light stability to rigid, poly(vinyl chloride) and is compatible therewith.

---

This application is a continuation-in-part of application Ser. No. 728,076 filed May 9, 1968, and now abandoned, which was, in turn a continuation-in-part of application Ser. No.474,514, filed July 23, 1965, and now abandoned, which was in turn, a continuation-in-part of application Ser. No. 386,396, filed July 30, 1964 and now abandoned.

This invention relates to the stabilization of poly (vinyl chloride) compositions against degradation of light and, in the preferred embodiments, against degradation by heat also. It relates further to the resulting stabilized polymeric compositions.

For convenience, the term "poly(vinyl chloride)" will be referred to throughout the specification as "PVC." As used in this application, the expression "rigid PVC" is intended to mean a vinyl chloride polymeric composition having no significant amount of plasticizer. "Rigid PVC" is used in opposition to the expression "flexible PVC" which is PVC containing a significant amount of plasticizer.

The sensitivity to both light and heat of PVC compositions has been recognized and, to some extent, dealt with by incorporating in the polymeric compositions to be stabilized effective amounts of heat stabilizers and/or light stabilizers. Recently an advance was made by the use, in combination of members of a specific class of heat stabilizers, along with members of a specific class of light stabilizers. Thus, in U.S. Patent 2,912,411, there is disclosed a means of stabilizing PVC compositions by incorporation of a phosphorous amide (as a light stabilizer) in addition to a conventional heat stabilizer (e.g., sodium carbonate, cadmium ricinoleate, or an organic epoxy hydrochlorophyl). While there is no definite statement in the patent that the PVC must be of the plasticized type, the fact is that only plasticized PVC was used in the examples, and an attempt to use the stabilizer of the patent on rigid PVC proves to be rather discouraging. Rigid PVC (i.e., PVC without plasticizer) is made only slightly more stable with the stabilizer of the patent than the control sample of PVC without any stabilizer. This can be seen from the following table.

TABLE I.—RIGID PVC

| Additive | | U.V. Exposure (hours) |
|---|---|---|
| Name | Conc., wt. percent | for ΔY.I.= 15 |
| Control | | (²) |
| Organo-tin-mercaptide (Thermolite 31) ¹ | 2 | 130 |
| Organo-tin-mercaptide (Thermolite 31) and Hexamethylphosphoric triamide | 2<br>0.5 | 185 |

¹ A commercially available di-n-butyl tin bis(isooctyl mercapto acetate).
² Degrades on mill.

This light stabilizer, found to be effective for plasticized PVC, is per se of only doubtful use for rigid PVC.

In view of this state of the art, it is an object of this invention to provide a stabilizer for rigid PVC which is capable of making PVC stable to the effects of light during the life of the shaped articles which are prepared from PVC either alone or in the presence of a heat stabilizer. It is a further object to provide a PVC composition containing an effective amount of such a stabilizer. Other objects will become apparent upon reading the following detailed description of the invention.

The foregoing objects are accomplished herein with great effectiveness in a surprisingly simple manner. In accordance with the present invention, PVC, whether or not it contains a conventional heat stabilizer such as is commonly employed to protect it through high temperature processing, is made stable to light by use of a light stabilizer comprising an amide of an aliphatic carboxylic acid and an ultraviolet light absorber. When such a stabilizer is used in an effective amount (for example, about 0.2% to about 6.0% based on the weight of PVC), PVC is able to withstand the degrading effects of light for long periods; much longer than could be expected from the known effectiveness of either the amide or the ultraviolet light absorber per se. This is quite surprising since the amide by itself is hardly capable of adding any stability to PVC, and it could not be expected that it would exercise a stabilizing function if used in conjunction with a U.V. absorber. It is noteworthy that levels of stability are attainable through the present invention which could not be reached by use of a U.V. absorber per se, even by doubling concentration levels. Up to a certain point, increasing concentrations of U.V. absorber are accompanied by increased polymer stability. Beyond this point, increasing the concentration of the U.V. absorber gives no beneficial effect, and sometimes may even reduce polymer stability. Because of this "peaking out" characteristic, it is not possible to obtain levels of stability beyond a certain point simply by increasing concentrations of the stabilizer. The problem is much more complex and the solution less evident. It is therefore a very significant accomplishment to improve stability of PVC beyond the levels which are attainable by conventional use of previously available additives.

The amides of aliphatic carboxylic acids which are useful in accordance with the present invention are represented by the following Formula I:

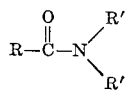

wherein R is alkyl of 1–18 carbons, alkenyl of 2–18 carbons (e.g., acrylyl, methacrylyl and oleyl), carbalkoxyalkyl of up to 36 carbons, carboxyalkyl of up to 18 carbons, carboxyalkenyl of up to 18 carbons, carbalkoxyalkenyl of up to 36 carbons, $(R')_2N—(CH_2)n—$, $(R')_2NCO(CH_2)n—$, $R'CONHCH_2(CH_2)n$, $(R')_2N-$ (alkenylene)—, $(R')NCO$(alkylene)— and $R'CONH-$(alkenylene); each R' is individually hydrogen, alkyl of 1–18 carbons, hydroxy-lower alkyl, lower alkoxy(lower alkyl) or cyano-lower alkyl; "alkylene" has up to 18 carbons; and $n$ is a number from 0–18 inclusive. Examples of compounds which may be used are the following:

(1) Alkanamides and N-substituted alkanamides such as myristamide, stearamide, caproamide, lauramide, N,N-dimethyllauramide, N,N-dimethylstearamide, N-(2-dodecyl)stearamide, N-(2-hydroxyethyl)myristamide, N-octadecyllauramide and N,N-bis(2-hydroxyethyl)lauramide;

(2) Alkenamides and N-substituted alkenamides such as acrylamide, methacrylamide, linoleamide, oleamide, N-2-dodecylacrylamide, N,N-dimethyloleamide, N-dodecyllinoleamide and N-methylmethacrylamide;

(3) Carboxyalkylcarboxamides (including carbalkoxyalkyl carboxamides), the corresponding carboxyalkenylcarboxamides and esters thereof and N-substituted derivatives such as succinamic acid, N,N-diethyl succinamic acid, N,N-diethyl succinamic acid butyl ester, N,N-bis-2-cyanoethyl succinamic acid, N-butylmaleamic acid and N,N-bis-2-hydroxyethyl adipic acid monoamide;

(4) Amino alkylcarboxamides and N-substituted products thereof such as 3-dimethylaminopropionamide, N-dodecyl-N-(2-hydroxyethyl)aminopropionamide, N - octadecyl 3-dimethylaminopropionamide; and (5) Bis-amides such as N,N-bis(ethoxymethyl)-hexanediamide, N,N,N',N'-tetrakis(cyanoethyl)succinamide, N,N,N',N' - tetraethylfuramide and N,N - dioctadecyladipamide.

The U.V. light absorbers which form the other component of the stabilizer of the present invention are well-known. Generally such ultraviolet light absorbers are of either the 2-hydroxybenzophenone, the 2-(2-hydroxyphenyl)benzotriazole, the aromatic carboxylic ester, the tri-(hydroxyaryl)triazine, the benzothiazoline, the benzylidene-malonic ester or the anilinomethylene-malononitrile type. Others may be employed so long as they are compatible with rigid PVC and have the effect of performing the normal U.V. absorber function in rigid PVC. It has been observed that the desirable enhancement of U.V. absorber activity by conjoint use with an amide of Formula I is not dependent upon the chemical structure of the absorber, but upon the physical attributes of compatibility and U.V. absorption which permit it to protect rigid PVC. Thus, a wide variety of chemically dissimilar U.V. absorbers for rigid PVC can be used in the practice of this invention.

Examples of ultraviolet absorbers which may be used are as follows:

(A) 2-hydroxybenzophenones: 2-hydroxy-4-methoxybenzophenone, 2,4 - dihydroxybenzophenone, 2,2' - dihydroxy - 4 - methoxybenzophenone, 2,2',4,4'-tetrahydroxybenzophenone, 2,2' - dihydroxy-4,4'-dimethoxybenzophenone, 2-hydroxy - 4 - butoxybenzophenone, 2-hydroxy-4-octyloxybenzophenone, 2 - hydroxy - 4 - dodecyloxybenzophenone, 2,2' - dihydroxy - 4 - octyloxybenzophenone, 4'-chloro-2-hydroxy-4-octyloxybenzophenone, etc.

(B) Benzotriazoles: 2 - (2 - hydroxy - 5 - methylphenyl) - benzotriazole, 2 - (2 - hydroxy - 5 - octylphenyl) benzotriazole, 2 - (2 - hydroxy - 4 - methoxyphenyl) benzotriazole, etc.

(C) Esters: Phenyl salicylate, tertiary-butyl-phenyl salicylate, phenyl resorcylate, p-octylphenyl benzoate, bis-(p-nonylphenyl) isophthalate, bis(p-nonylphenyl)-terephthalate, etc.

(D) Triazines: 2,4,6 - tris(2 - hydroxy - 4 - octyloxyphenyl) - s - triazine, 2 - (2 - hydroxy - 4 - octyloxyphenyl)-4,6-dixylyl-s-triazine, etc. These compounds are the subject of U.S. Patent 3,118,887, issued Jan. 21, 1964, to Hardy et al.

(E) Benzothiazolines: 2 - (4 - methoxyphenylimino)-3-ethylbenzothiazoline, etc. These materials are disclosed in U.S. Patent 2,393,801.

(F) Benzylidene-malonic esters: Diethyl p-methoxybenzylidenemalonate, diethyl o-methoxybenzylidenemalonate, diethyl p-hydroxybenzylidenemalonate, diethyl diphenylmethylenemalonate, etc. This class of ultraviolet absorbers is disclosed in copending application of Susi, Ser. No. 362,182, filed Apr. 23, 1964 and now abandoned.

(G) Arylaminoethylenes: N - methyl - p - methoxyanilinomethylenemalonitriles disclosed in U.S. Patent 3,079,366.

(H) Guanidines of the 1,2-dibenzoyl-3-arylguanidine class (disclosed in application Ser. No. 386,386, filed July 30, 1964, and now abandoned) as exemplified by 1,2-dibenzoyl - 3 - (p - methoxyphenyl)guanidine, 1,2 - dibenzoyl - 3 - (p - chlorophenyl)guanidine, 1,2 - di - (p-methoxybenzoyl)-3-(p-methoxyphenyl)guanidine, and the like.

(I) Aryl acrylonitrile and arylacrylic acid derivatives such as: Diphenylmethylenecyanoacetic acid ethyl ester; diphenylmethylenecyanoacetic acid octyl ester and diphenylmethylenemalononitrile. These are disclosed in U.S. Patents 3,111,417, 3,149,146 and 3,085,097.

The amount of ultraviolet absorber should be between 0.1 and 5.0% preferably between 0.2 and 1.0% based on the weight of the rigid PVC. The amount of aliphatic amide should be between 0.1 and 5.0% preferably between 0.5 and 3.0%, based on the weight of the PVC. As will be noted, the amide concentration can be equal to, or preferably greater than the concentration of the ultraviolet absorber.

Combining the aliphatic amide and the U.V. absorber results in a light stabilizing system having two components.

Since the amide component by itself provides very little added stability to rigid PVC, it is indeed surprising that the same component along with a U.V. absorber provides a degree of stability which was not attainable with either component alone.

It should be noted that the invention also contemplates, in its preferred embodiments, the stabilization of PVC against degradation by both heat and light such as might be encountered during normal usage of articles manufactured from PVC. Other heat stabilizers may be necessary to prevent PVC from being degraded by high temperatures required for milling, molding and compounding the PVC if such are utilized. The heat stabilizers which are useful for this purpose can be any of the conventionally available types. While rigid PVC is always processed commercially in the presence of a heat stabilizer and the same types are useful herein in normally effective amounts, use of such heat stabilizers are not necessary to obtain the benefits of this invention. Most heat stabilizers are organo-metallic compounds. However, inorganic compounds such as sodium carbonate are also useful. Among the heat stabilizing organo-metallic compounds are the organo-tin compounds (dibutyl tin dimaleate, dibutyl tin dilaureate, dibutyl tin thioglycolic acid octyl ester, di-n-butyl tin bis(isooctyl mercapto acetate); the cadmium or barium salts (barium stearate, cadmium stearate, barium ricinoleate, cadmium ricinoleate, barium octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343–374.

When used with a heat stabilizer, the light stabilizer of the present invention may be added as a whole to the rigid PVC or the components may be added separately.

Generally, the heat stabilizer is the first to be put into the PVC, and the light stabilizers are then incorporated into this blend by conventional milling procedures. After thorough blending, the PVC can then be shaped into a film or other articles of manufacture by compression-molding, extrusion, injection-molding, calendering, etc.

Other additives may be employed to modify the rigid PVC for the intended application. Among such additives are fillers, antistatic agents, pigments (including $TiO_2$), dyes, lubricants, etc.

The following examples, in which parts and percentages are on the basis of weight, are presented to further illustrate the present invention.

EXAMPLE 1

Films of 50-mil thickness are prepared from a PVC composition containing 2.0% of a commercial organo-tin-mercaptide (Thermolite 31) as heat stabilizer and no plasticizer. All but one of the film samples are formulated with additional additives at concentrations shown in Table II. The films are exposed to ultraviolet light using a Fluorescent Sunlamp-Blacklight (FS-BL) lamp. The exposure is continued until the tested sample shows a change in yellow index (Y.I.) of 15. This increase in yellow color is determined on a differential colorimeter ("Colormaster") using the following formula (see Example 8, U.S. Patent No. 3,079,366):

$$\text{Yellow index} = 70 \left(1.00 \frac{\text{Blue}}{\text{Green}}\right)$$

The following additives were used in this test:
Additive A—N,N-dimethyl stearamide
Additive B—2-hydroxy-4-methoxybenzophenone
Additive C—2-(2-hydroxy-5-methylphenyl) benzotriazole
Additive D—Diethyl p-methoxybenzylidenemalonate
Additive E—N-(2-dodecyl)acrylamide
Additive F—N,N-dimethyl oleamide
Additive G—N,N-bis(2-cyanoethyl)succinamic acid
Additive H—Stearamide
Additive I—N-(n-dodecyl)linoleamide
Additive J—N-decyl-3-dimethylaminopropionamide
Additive K—N-octadecyl-3-dimehtylaminopropionamide
Additive L—N,N-bis(2-hydroxyethyl)lauramide
Adidtive M—N-(2-hydroxyethyl)lauramide
Additive N—N-dodecyl-N-(2-hydroxyethyl) aminopropionamide
Additive O—N,N-bis(ethoxymethyl)hexanediamide
Additive P—N,N,N',N'-tetrakis(cyanoethyl)succinamide

TABLE II

| Additive | | | | FS-BL exposure |
|---|---|---|---|---|
| No. | Name | Percent wt. | Initial Y.I. | (hours) to ΔY.I. 15 |
| 1 | None | | 2 | 130 |
| 2 | A | 0.5 | 3 | 150 |
| 3 | B | 0.5 | 3 | 420 |
| 4 | {A / B} | {0.5 / 0.5} | 3 | 640 |
| 5 | C | 0.5 | 3 | 580 |
| 6 | {A / C} | {0.5 / 0.5} | 3 | 820 |
| 7 | D | 0.5 | 3 | 620 |
| 8 | {A / D} | {0.5 / 0.5} | 2 | 780 |
| 9 | E | 0.5 | 5 | 160 |
| 10 | {B / E} | {0.5 / 0.5} | 3 | 850 |
| 11 | {D / F} | {0.5 / 0.5} | 3 | 710 |
| 12 | {B / F} | {0.5 / 0.5} | 3 | 830 |
| 13 | {D / E} | {0.5 / 0.5} | 5 | 710 |
| 14 | {B / G} | {0.5 / 0.5} | 3 | 790 |
| 15 | {B / K} | {0.5 / 0.5} | 26 | >970 |
| 16 | {B / H} | {0.5 / 0.5} | 3 | 630 |
| 17 | {B / I} | {0.5 / 0.5} | 4 | 620 |
| 18 | {B / J} | {0.5 / 0.15} | 10 | 590 |

TABLE II—Continued

| Additive | | | | FS-BL exposure |
|---|---|---|---|---|
| No. | Name | Percent wt. | Initial Y.I. | (hours) to ΔY.I. 15 |
| 19 | {B / L} | {0.5 / 0.5} | 6 | 1,160 |
| 20 | {B / M} | {0.5 / 0.5} | 3 | 1,100 |
| 21 | {N / B} | {0.5 / 0.5} | 17 | [1] 1,650 |
| 22 | {O / B} | {0.4 / 0.5} | 4 | [2] 830 |
| 23 | {P / B} | {0.5 / 0.5} | 3 | [3] 830 |
| 24 | F | 0.5 | 3 | 140 |
| 25 | G | 0.5 | 3 | 120 |
| 26 | K | 0.5 | 27 | 160 |
| 27 | H | 0.5 | 3 | 140 |
| 28 | I | 0.5 | 4 | 120 |
| 29 | L | 0.5 | 8 | 120 |
| 30 | M | 0.5 | 3 | 150 |

[1] ΔY.I.=8.
[2] ΔY.I.=9.
[3] ΔY.I.=11.

From Table II it can be noted that the amides by themselves gave virtually no added stability to rigid PVC. It can also be noted that the individual ultraviolet light absorbers, while enhancing the stability of the rigid PVC to a large extent, did not approach the effectiveness of the combination stabilizer in accordance with the present invention.

Other ultraviolet absorbers of the classes outlined above can be substituted with a similar improvent in effectiveness for the ultraviolet absorbers used in Example 1. The stabilizing influence of the following U.V. absorbers is likewise improved by use in combination with amides of Formula I: 2,2'-dihydroxybenzophenone, 2-hydroxy-4-octyloxybenzophenone, phenyl salicylate, bis(p-nonylphenyl) - isophthalate, 2,4,6 - tris(2 - hydroxy-4-octyloxyphenyl)-s-triazines, dioctyl diphenylmethylenemalonate and N-methyl-p-methoxyanilinomethylene malononitriles. Likewise, other amides within the scope of Formula I can be used in place of those shown in the table with equivalent results.

EXAMPLE 2

This example shows the effective stabilization of PVC containing a pigment, using the stabilizer of this invention.

PVC containing 2.0% $TiO_2$ was milled into 50 mil film samples and these were exposed to U.V. light and observed for yellowness at the end of 269 and 479 hours. One sample contained no stabilizer (No. 1). The others contained additives as indicated in the following table using the same abbreviations as in Example 1.

TABLE III

| Additive | | Concentration (percent) | Initial Y.I. | FS-BL exposure | |
|---|---|---|---|---|---|
| No. | Name | | | 269 hours ΔY.I. | 479 hours ΔY.I. |
| 1 | | | 0 | 8 | 16 |
| 1 | B | 0.5 | 2 | 8 | 15 |
| 3 | {A / B} | {0.5 / 0.5} | 2 | 3 | 8 |

EXAMPLE 3

Five PVC films were prepared without any heat stabilizer present. One film was utilized as a control and had no additive present. A second film contained 1.0% of Additive A (N,N-dimethylstearamide). The third and fourth films contained 0.5% and 1.0%, respectively, of Additive B (2-hydroxy-4-methoxybenzophenone). The fifth film (in accordance with the present invention) contained 0.5% of Additive A plus 0.5% of Additive B. Each film was compression molded directly from the homopolymer powder (after dry blending a portion of the powder with the appropriate additive or additives where used). The five films were then exposed to ultraviolet light using a Fluorescent Sunlamp-Blacklight (FS- BL) lamp for 75 hours and the change in yellow index was measured using a differential colorimeter ("Colormaster"), as in Example 1. The results are shown below in Table IV.

TABLE IV

| Description | Initial Y.I. | ΔY.I. on exposure for 75 hours |
|---|---|---|
| Control, no additive | 4+ | 36 |
| PVC+1.0% additive A | 3 | 40 |
| PVC+0.5% additive B | 4 | 15 |
| PVC+1.0% additive B | 4 | 6+ |
| PVC+0.5% additive A+0.5% additive B | 3+ | 3 |

This example shows that, in the absence of a heat stabilizer, the amide alone produced no light stabilizing effect but that, when used in combination with an ultraviolet absorber the greatly enhanced light stabilizing effect of the present invention was obtained.

In total, these examples clearly demonstrate the beneficial light stabilizing effect of the stabilizer combinations of the present invention in rigid PVC in the presence of and in the absence of heat stabilizers.

I claim:
1. Rigid poly(vinyl chloride) stabilized against the deteriorating effects of light by having incorporated therein a stabilizer comprising the following materials:
   (a) an aliphatic amide having the formula:

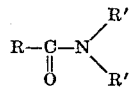

wherein R is either alkyl of 1–18 carbons, alkenyl of 2–18 carbons, carboxyalkyl of up to 18 carbons, carbalkoxyalkyl of up to 36 carbons, carboxyalkenyl of up to 18 carbons, carbalkoxyalkenyl of up to 36 carbons, $(R')_2N-(CH_2)n$, $(R')_2NCO(CH_2)n-$, $(R')_2N$-(alkenylene)—, R'CONH-(alkenylene)— and $(R')_2NCO$-(alkylene)—, $R'CONHCH_2(CH_2)n-$, each R' is individually either hydrogen, alkyl of 1–18 carbons, hydroxy(lower alkyl), lower alkoxy(lower alkyl) or cyano(lower alkyl); where "alkenylene" has up to 18 carbons and $n$ is a number from 0–18 inclusive; and
   (b) an ultraviolet absorber which is compatible with rigid poly(vinyl chloride) and is per se capable of imparting light stability to rigid poly(vinyl chloride); each of said materials being present in a concentration of 0.1 to 5.0%, based on the weight of the rigid poly(vinyl chloride).

2. A rigid poly(vinyl chloride) composition in accordance with claim 1 having an effective amount of a heat stabilizer.

3. Rigid poly(vinyl chloride) stabilized against the deteriorating effects of light by having incorporated therein at least 0.2% of both N,N-dimethylstearamide and 2-hydroxy-4-methoxybenzophenone.

4. Rigid poly(vinyl chloride) stabilized against the deteriorating effects of light by having incorporated therein at least 0.2% of both N,N-dimethyloleamide and 2-hydroxy-4-methoxybenzophenone.

5. Rigid poly(vinyl chloride) stabilized against the deteriorating effects of light by having incorporated therein at least 0.2% of both N-(2-dodecyl)acrylamide and 2-hydroxy-4-methoxybenzophenone.

6. Rigid poly(vinyl chloride) stabilized against the deteriorating effects of light by having incorporated therein at least 0.2% of both N,N-dimethylstearamide and 2-(2-hydroxy-5-methylphenyl)benzotriazole.

7. Rigid poly(vinyl chloride) stabilized against the deteriorating effects of light by having incorporated therein at least 0.2% of both N,N-bis(2-hydroxyethyl)lauramide and 2-hydroxy-4-methoxybenzophenone.

8. Rigid poly(vinyl chloride) stabilized against the deteriorating effects of light by having incorporated therein at least 0.2% of both stearamide and 2-hydroxy-4-methoxybenzophenone.

9. Rigid poly(vinyl chloride) stabilized against the deteriorating effects of light by having incorporated therein at least 0.2% of both N,N-dimethylstearamide and diethyl p-methoxybenzylidenemalonate.

References Cited

UNITED STATES PATENTS 2,464,855   3/1949   Duggan et al. _____ 260—23 XR

DONALD E. CZAJA, Primary Examiner

M. J. WELSH, Assistant Examiner

U.S. Cl. X.R.
260—45.75, 45.85, 45.9